Jan. 11, 1949. A. HENDERSON Re. 23,074

PRECAST CONCRETE CORRUGATED CONNECTION

Original Filed May 12, 1945 4 Sheets-Sheet 1

INVENTOR
Albert Henderson
by his attorneys
Stebbins, Blenko & Webb

PRECAST CONCRETE CORRUGATED CONNECTION
Original Filed May 12, 1945 4 Sheets-Sheet 2
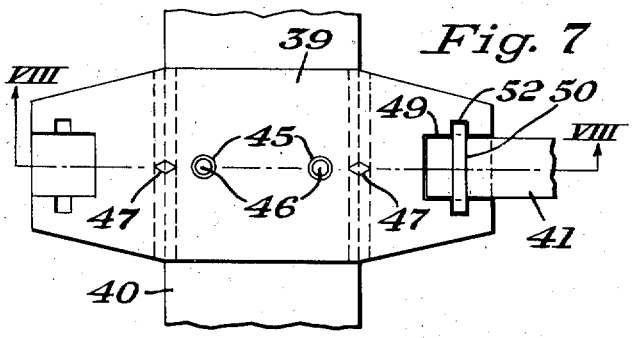
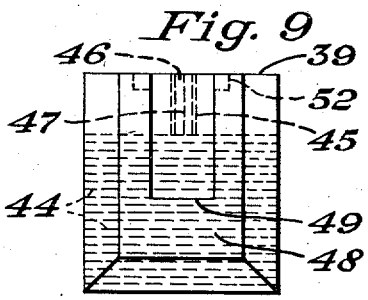
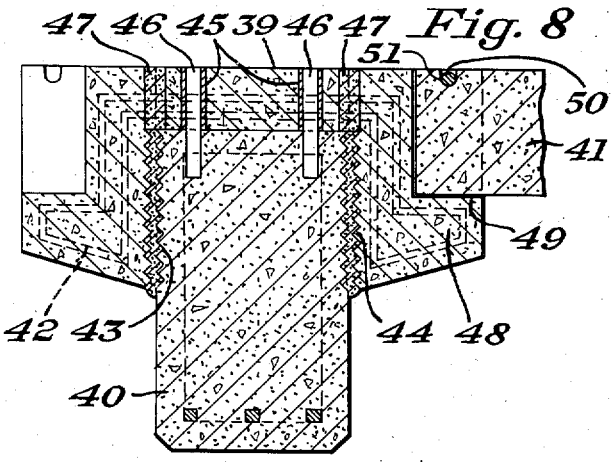
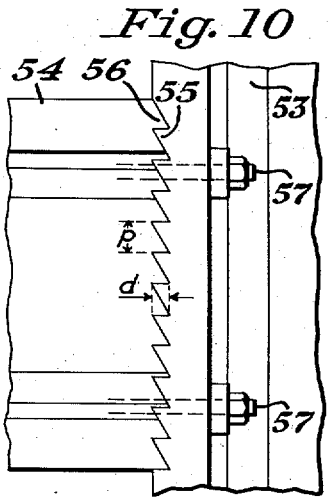
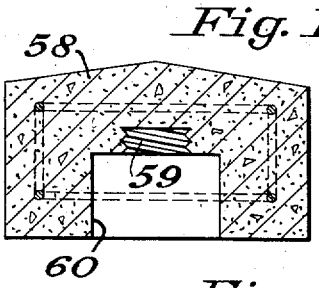
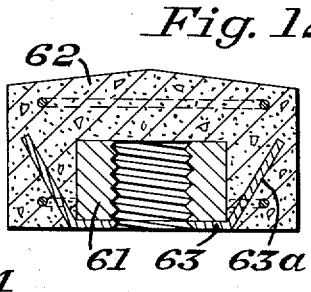
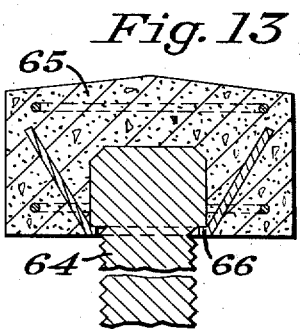
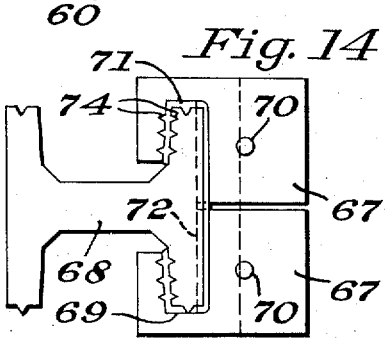
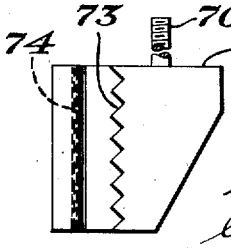
INVENTOR
Albert Henderson
by his attorneys
Stebbins, Blenko & Webb

PRECAST CONCRETE CORRUGATED CONNECTION

Original Filed May 12, 1945 4 Sheets-Sheet 3

INVENTOR
Albert Henderson
by his attorneys
Stebbins, Blenko & Webb

PRECAST CONCRETE CORRUGATED CONNECTION

Original Filed May 12, 1945 4 Sheets-Sheet 4

INVENTOR
Albert Henderson
by his attorneys
Stebbins, Blenko & Webb

Reissued Jan. 11, 1949 Re. 23,074

UNITED STATES PATENT OFFICE 23,074

PRECAST CONCRETE CORRUGATED CONNECTION

Albert Henderson, Pittsburgh, Pa., assignor, by mesne assignments, to The Cemenstone Corporation, Pittsburgh, Pa., a corporation of Pennsylvania Original No. 2,414,738, dated January 21, 1947, Serial No. 593,375, May 12, 1945. Application for reissue January 14, 1948, Serial No. 2,186

10 Claims. (Cl. 72—106)

This invention relates to building construction and, in particular, to connections whereby precast concrete members may be assembled in the course of erecting a building.

The use of precast concrete members in building construction was first proposed many years ago but has not achieved very wide acceptance. I believe this is due principally to the lack of satisfactory means for securing together various types of members, i. e., columns, girders, beams, etc. I have invented a novel system of connections for precast members having the ability to transmit shear stress from one member to another with high efficiency. In a preferred embodiment, my connections comprise coacting surfaces on the members to be connected having similar corrugated surfaces. The corrugations on the adjacent surfaces may actually mesh or interfit with each other or may be spaced apart with a grout filling in the intervening space. Where the corrugations mesh with each other, a thin layer of grout is preferably disposed thereon before the surfaces are abutted. My invention also contemplates the use of bolts in making certain types of connections, and I provide a connecting bolt having a protective cap of concrete cast on the head thereof as well as a nut of similar construction and a separate cover adapted to be disposed over a nut after it has been turned down on a bolt.

Precast corrugated connections, according to my invention may take a variety of forms, some of which are illustrated in the accompanying drawings and will be described in detail hereinafter. In the drawings, Figure 1 is a partial plan view of a girder having supporting brackets attached thereto adapted to receive the ends of beams;

Figure 7 is a view similar to Figure 1 showing a modified construction;

Figure 8 is a section taken along the plane of line VIII—VIII of Figure 7;

Figure 9 is a partial side elevation of a supporting bracket used in the construction illustrated in Figures 7 and 8;

Figure 10 is a partial elevation showing a modified form of connection between a column and girder;

Figure 11 is an axial section through a precast concrete nut cover;

Figure 12 is a similar view showing a nut embedded in a precast cover;

Figure 13 is a similar view showing a protective cap cast on the head of a bolt;

Figure 14 is a plan view of a column of H-section having a pair of brackets associated therewith forming a shelf adapted to support a girder or the like;

Figure 15 is an elevation of one of the brackets;

Figure 1:
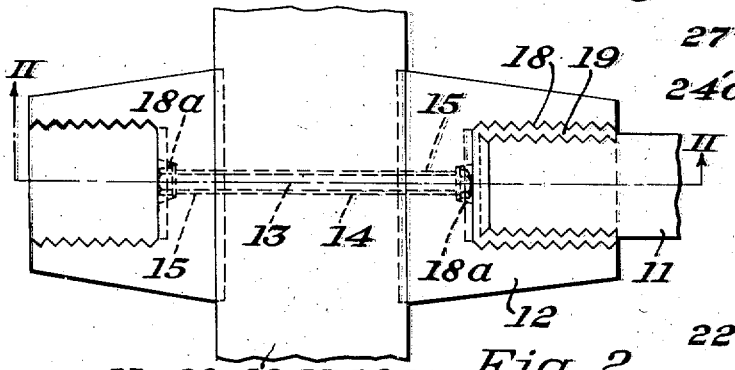
Figure 2:
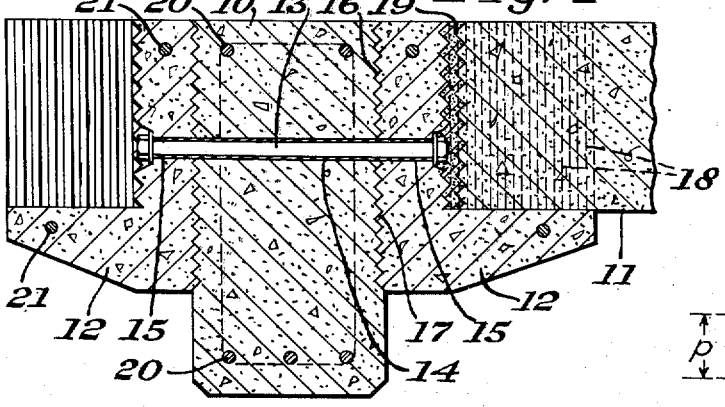
Figure 2 is a section taken along the plane of line II—II of Figure 1.

Figures 1 and 2 illustrate a connection between a girder 10 and a beam 11. Precast brackets 12 are secured to the girder by a through bolt 13. Pipe lengths 14 and 15 are embedded in the girder and brackets to accommodate the bolt. Instead of through bolt 13 I may use two separate bolts and embed nuts in the girder 10 to receive them. These nuts should be threaded on suitable anchor rods embedded in the girder. The sides of the girder are corrugated as at 16 and the contacting faces of the brackets have corrugations 17 meshing therewith. A thin layer of grout is applied between the contacting surfaces of the girder and brackets.

The brackets have pockets 18 formed therein adapted to accommodate the ends of beams, such as that indicated at 11. The inner surfaces of the sides and end of the pockets are corrugated and the end portions of the beams 11 are similarly corrugated on both the sides and extreme end thereof. The maximum width of the beam 11, i. e., the width from crest to crest of the corrugations, is less than the minimum width of the pocket 18, i. e., from crest to crest of the corrugations, so that the end of the beam may be moved longitudinally into the pocket. It may also, of course, be set therein from above. In any event, the corrugations of the two members do not mesh but are spaced apart. The space 19 between the beam and the bracket is filled with grout. When the grout has set, the corrugations in the sides of the pockets and on the sides of the beam prevent the beam from pulling out of the bracket. The corrugations on the inner end of the pocket and on the extreme end of the beam, being locked against relative vertical movement by the grout, transmit shear from the beam to the bracket. A similar transmission from the bracket to the girder is effected by the meshing corrugations on the contacting surfaces thereof. The girder and brackets have reinforcing members embedded therein as indicated at 20 and 21. The beam 11 may be similarly reinforced.

Figure 3:
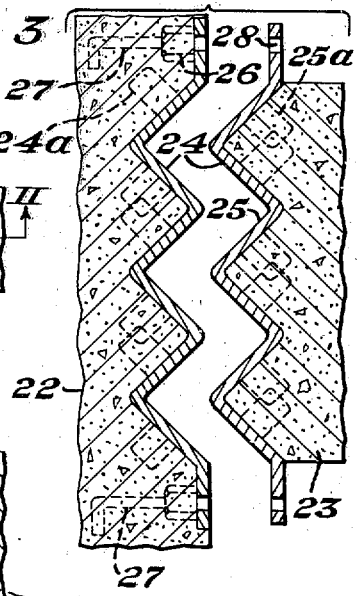
Figure 3 is a partial section through the meeting surfaces of adjacent members spaced slightly apart, showing a modified form of corrugation adapted to provide a connection therebetween.

Figure 3 shows corrugated surfaces of members 22 and 23 to be connected, the corrugated surfaces being provided with metallic armor in the form of plates 24 and 25 having tongues 24*a* and 25*a* struck up therefrom and embedded in the members 22 and 23. In addition, double nuts 26 welded to the upper and lower ends of the armor 24 have anchor bolts 27 threaded therein and embedded in the member 22. Holes 28 in the upper and lower ends of armor 25 permit the member 23, which may be a beam, to be secured to the member 22, which may be a column, by suitable screws. The armored type of connection shown in Figure 3 makes grout unnecessary and exhibits a very high efficiency in transmitting shear load.

Figure 4:
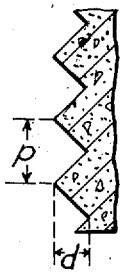
Figure 4 is a diagram illustrating the dimensioning of the corrugations.

Figure 4 illustrates the corrugations in the surfaces of the various members to enlarged scale. These corrugations are preferably so proportioned that the pitch $p$ is equal to twice the depth $d$. In other words, the sloping faces of the corrugations make 45° angles with the surfaces of the members in which they are formed.

The relation of the pitch and depth may be expressed mathematically as $p=2d$. The pitch is preferably 1″ and the depth ½″ so that members of standard dimensions, such as 8″ x 8″, 8″ x 10″, 12″ x 12″, 12″ x 14″, etc., will have an even number of corrugations across their vertical or horizontal faces.

Figure 5:
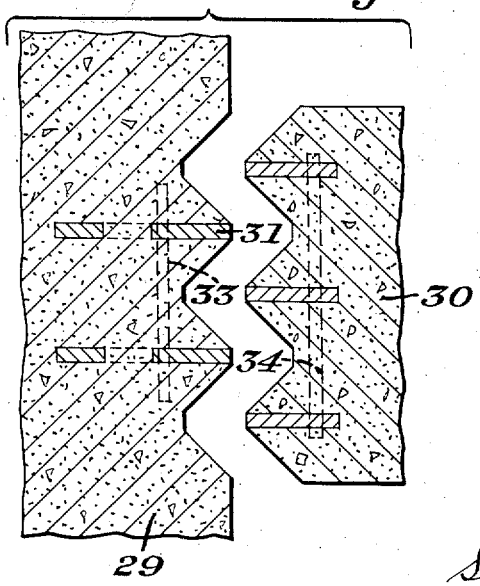
Figure 5 is a view similar to Figure 3 showing a reinforced corrugation.

Figure 5 shows reinforced corrugations formed in members 29 and 30 adapted to be connected, e. g., a column and beam, respectively. As illustrated, the member 29 has spaced flat bars 31 and the member 30 similar bars 32 embedded therein with their edges centered on the crests of the corrugations and projecting to the extremity thereof. The flat bars 31 and 32 may be welded to round spacer bars 33 and 34 embedded in the members. Since the edges of the bars 31 and 32 are exposed at the crests of the corrugations, the roots are flat to conform therewith.

Figure 6:
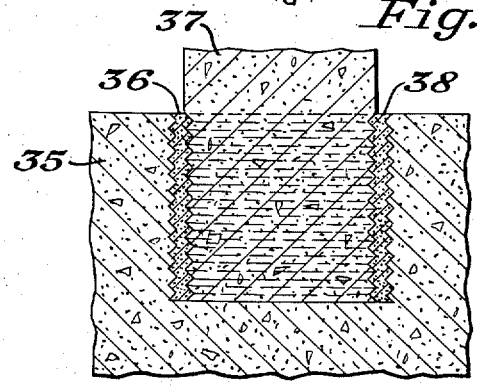
Figure 6 is a partial section through a precast concrete member and a support therefor showing a corrugated connection therebetween.

Figure 6 shows a member 35 having a pocket 36 therein adapted to receive the end of a member 37. The member 35 may be a column base and the member 37 a column. The sides of the pocket 36 are corrugated and also the sides of the member 37 to the depth of the pocket. The dimensions of the member 37 are related to those of the pocket 36 in the same manner as those of the end of the beam 11 to the pocket 18 in bracket 12. Thus the end of the member 37 may be set in the pocket 36 and the space 38 therebetween filled with grout. This provides a permanent connection between the members capable of transmitting shear stress almost to the full strength of a monolithic structure of similar shape and dimensions. It will be understood that all four sides of the member 37 and all four sides of the pocket 36 have corrugations formed therein.

Figures 7 and 8 illustrate a modified form of connection comprising a saddle bracket 39 adapted to be placed on a girder 40 for supporting beams 41 thereon. The bracket is generally yoke shaped and has reinforcing rods 42 embedded therein. The sides of the girder are corrugated at 43 and the inner surfaces of the depending sides of the bracket are similarly corrugated as at 44, the space between the corrugations being filled with grout. Positioning pins 45 are embedded in the girder and project upwardly therefrom. The bracket has pipe lengths 46 embedded therein and welded to the reinforcing bars 42 for accommodating the pins 45. Vertical keying grooves 47 are filled with grout to prevent shifting of the bracket.

The bracket has shelves 48 with pockets 49 formed therein adapted to receive the ends of beams 41. Securing pins 50 disposed in slots 51 in the ends of beams 41 and in recesses 52 in the sides of the pockets tie the beams to the bracket. In the case of end girders, brackets corresponding to one-half the bracket 39 may be employed.

Figure 10 shows a modified corrugated connection between a support, such as a column 53 of H-section, for example, and a beam 54 of similar section. The column flange and the end of the beam have interfitting corrugations 55 and 56. These corrugations have one sloping side and one horizontal side. Anchor bolts 57 embedded in the beam extend through holes in the column flange and are secured thereto by nuts. The corrugations 55 and 56, like those previously described, are 1″ wide and ½″ deep. The corrugated surfaces are preferably grouted before the connection is made. It will be apparent that the connection shown in Figure 10 does not require a supporting shelf or bracket.

Figure 11 shows a precast reinforced nut cover 58 having a threaded socket 59 therein to accommodate the end of a bolt. The cover 58 is preferably placed on a nut after the latter has been turned down and the threads of the pocket 59 are engaged with the threaded end of the bolt protruding beyond the nut. The cavity 60 in the cover is cylindrical and of such size as to permit the cap to turn on the nut.

Figure 12 shows a nut 61 having a cover 62 cast thereon. The nut is preferably welded to a reinforcing member 63 having wings 63*a* extending outwardly therefrom and embedded in the concrete forming the cover. This type of nut may be turned down on a bolt by a suitable wrench applied to the exterior of the cover.

Figure 13 shows a bolt 64 having a cover 65 cast on the head thereof. A reinforcing member 66 similar to that shown at 63 is welded to the lower face of the head.

The nut covers shown in Figures 11 and 12 and the bolt-head cover of Figure 13 make the connections requiring bolts and nuts weatherproof and fireproof.

Figures 14 and 15 illustrate a bracket composed of two similar members 67 adapted to engage a flange of an H-shaped member 68 such as a column. The inner faces of the members 67 are recessed as at 69 to accommodate the flanges of the column. Anchor bolts 70 extend upwardly above the top face of the brackets and are adapted to enter holes in a beam or girder placed thereon. The bracket members are thus secured together. They are also grouted to the column as shown at 71. The flanges engaged by the bracket members are corrugated horizontally as at 72 and the inner faces of the bracket members are similarly corrugated as at 73 so that the shear load applied to the bracket members is transmitted to the column. Grooves 74 in the adjacent faces of the bracket members and column flanges aid in preventing separation of the bracket members from the column.

Figure 16:
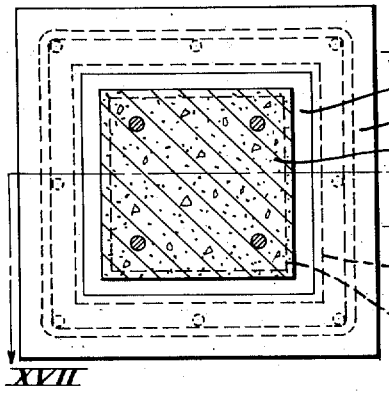
Figure 16 is a section through a precast member showing in elevation a sleeve connecting two similar members end-to-end.
Figure 17:
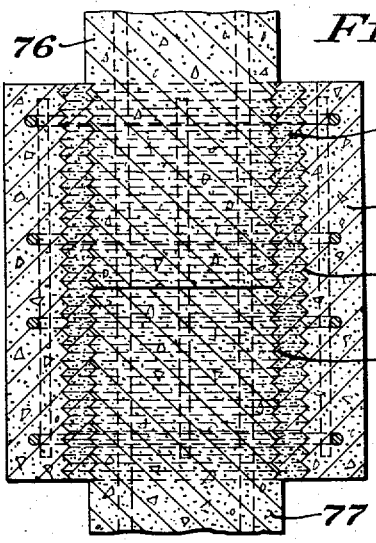
Figure 17 is a section taken along the plane of line XVII—XVII of Figure 16.

Figures 16 and 17 illustrate a one-piece connecting sleeve 75 adapted to connect two members 76 and 77 end-to-end. The sleeve 75 is precast and reinforced. It has corrugations 78 extending around the interior. The abutting ends of the members 76 and 77 have similar corrugations 79. When the members have been assembled, as illustrated, the intervening space is filled with grout as indicated at 80.

Figure 19:
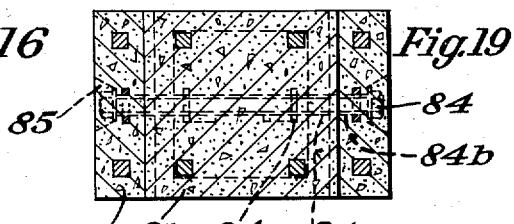
Figure 19 is a transverse section taken along the plane of line XIX—XIX of Figure 18.
Figure 18:
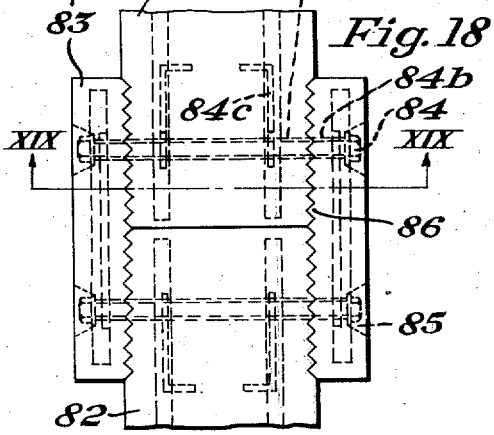
Figure 18 is a partial plan view of a modified form of connection between members disposed end-to-end.

Figures 18 and 19 show a modified connection between members 81 and 82 disposed end-to-end. Precast reinforced splice plates 83 are disposed on opposite sides of the members 81 and 82 and secured thereto by through bolts 84. Pipe lengths **84*a* and 84*b* are embedded in the members and splice plates to accommodate the bolts, and may be welded to the reinforcing in the members and splice plates, respectively. The pipe lengths 84*a* have anchor bars 84*c* welded thereto and embedded in the members. Links 84*d* embedded in the splice plates provide connections between the bolts through adjacent members. The links extend around the pipe lengths 84*b*. The heads of the bolts and the nuts turned on the threaded ends thereof fit into sockets 85 in the splice plates which are filled with grout after the nuts have been turned home, thus making the joint fireproof and corrosionproof. The contacting surfaces of the plates 83 and members 81 and 82 have meshing corrugations 86** formed therein. A thin layer of grout may be applied thereto before the members are assembled and finally secured together.

The aggregate section of reinforcing rods in the splice plates is equal to that in either one of the members 81 and 82. The connection between the latter thus has practically the full strength of either member.

Figure 20:
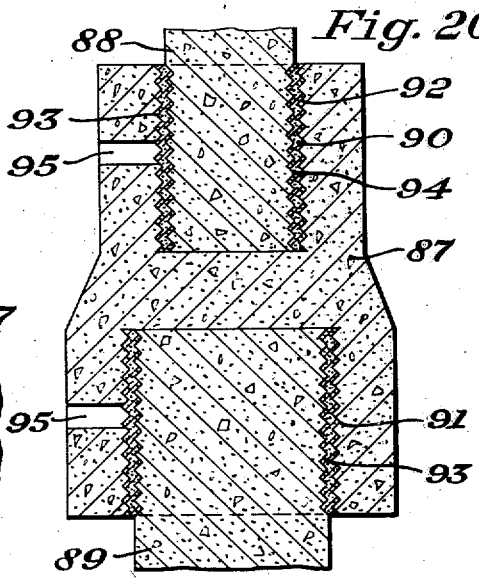
Figure 20 is a partial section taken centrally through a precast connecting sleeve adapted to connect precast members of different sizes end-to-end.

Figure 20 illustrates a precast connecting sleeve 87 adapted to unite precast members 88 and 89 of different cross sectional areas. The sleeve 87 and the members 88 and 89 are precast and reinforced. The sleeve 87 has a socket 90 adapted to receive the end of member 88 and a socket 91 adapted to receive the end of member 89. The side walls of the sockets are corrugated as at 92 and the ends of the members 88 and 89 as at 93. The sizes of the sockets are such as to permit the members 88 and 89 to enter freely therein. When the members have been assembled with the sleeve, the space therebetween is filled with grout as at 94. Holes 95 through the sides of the sleeve communicating with the sockets facilitate the grout-filling operation.

Figure 21:
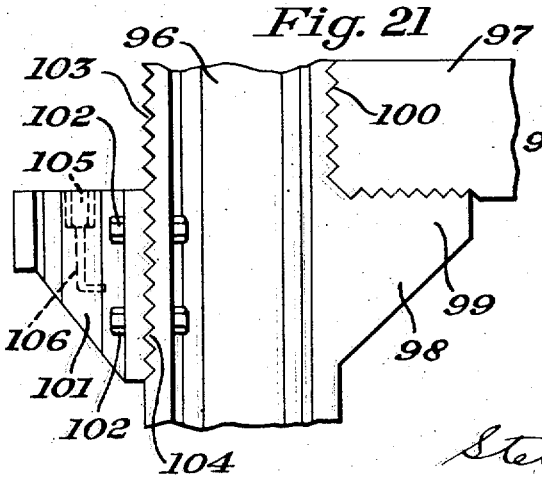
Figure 21 is a partial elevation of a column showing integral and separately formed shelf brackets adapted to receive the ends of adjacent members.

Figure 21 shows further forms of connections between a member 96 of H-shape, such as a column, and a member supported thereon, such as a beam 97. A bracket 98 formed integral with the column has its upper surface corrugated as at 99. The column flanges are corrugated above the bracket as at 100. The end and bottom of the beam 97 have corrugations meshing with those indicated at 99 and 100, a thin layer of grout being applied over the contacting surfaces before they are put together.

On the other side of the beam, a separately formed bracket 101 is attached thereto by bolts 102. The outer faces of the adjacent flanges of the member 96 are corrugated as at 103 and the vertical face of the bracket has corrugations 104 meshing therewith, a thin layer of grout being applied therebetween. The bracket 101 has a double nut 105 embedded therein. The nut is threaded on an anchor bolt 106 and is adapted to receive a bolt inserted through a hole in a beam resting on the bracket for securing it thereto. As shown, the corrugations 103 extend above the bracket 101. The beam supported on the bracket may thus have its end corrugated as shown at 108 on the beam 97. By this construction, a portion of the shear load on the beams is transmitted directly to the column, the remainder being borne by the brackets. In the case of the bracket 98, corrugations on the upper face thereof prevent the beam from pulling away from the column.

Figure 22:
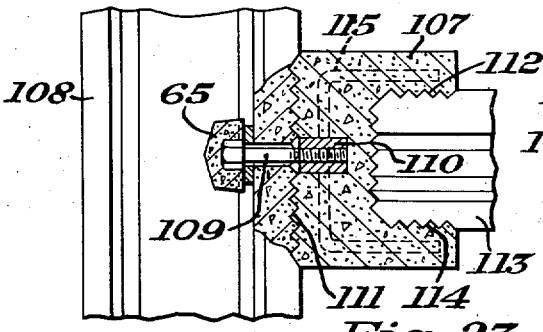
Figure 22 is an elevation with parts in section showing a different form of bracket adapted to be secured to a column for supporting a beam.

Figure 22 shows a further modified form of bracket 107 secured to a support such as an H-shaped column 108 by bolts 109 inserted through holes in the flanges of the latter. The bolts are threaded into nuts 110 embedded in the bracket which is precast and reinforced. The bolts 109 have covers 65 on the heads thereof. The contacting surfaces of the bracket and column have meshing corrugations 111. The bracket 107 has a socket 112 formed therein adapted to receive the end of a beam 113 which is illustrated as of H-shape in section. The walls of the socket 112 and the end of the beam 113 have meshing corrugations 114. The beam and bracket are assembled by sidewise sliding movement of one relative to the other after a thin film of grout has been applied to the contacting surfaces. The corrugations 111 have a similar film of grout applied thereover. The nuts 110 are welded to reinforcing rods 115 embedded in the bracket.

Figure 23:
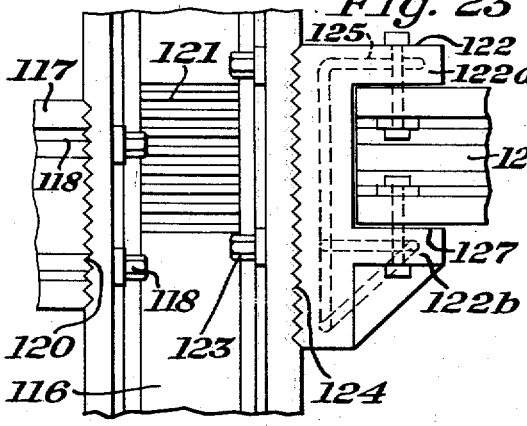
Figure 23 is a partial elevation showing a corrugated connection between it and a beam supported thereon and also a different form of supporting bracket adapted to receive a beam.

Figure 23 illustrates a still further form of connection between a support such as a column 116 and a precast member supported thereon such as a beam 117. In the embodiment illustrated, the column and beam are of H-shape in section. The beam 117 is secured to the column by bolts 118 inserted through holes in the column flanges and threaded into double nuts embedded in the beam as illustrated at 26 in Figure 3. The contacting surfaces of the beam and column have meshing corrugations 120 formed therein. A thin film of grout is applied over these surfaces before the members are connected. The corrugations serve to transmit the shear load on the beam to the column as already explained. The web of the column may have corrugations 121 to receive a beam extending at right angles to the beam 117.

On the other side of the beam 116, a precast reinforced bracket 122 is secured by bolts 123 similar to the bolts 118. The contacting surfaces of the bracket and column have meshing corrugations 124 to which a thin film of grout is applied before the bracket is secured in place. The bracket has upper and lower shelves 122a and 122b. Bolts 125 extend through the latter and through holes in the flanges of a member 126, such as a beam of H-shape in section. The end of the beam is received between the shelves of the bracket, a thin layer of grout 127 being applid therebetween.

Figure 24:
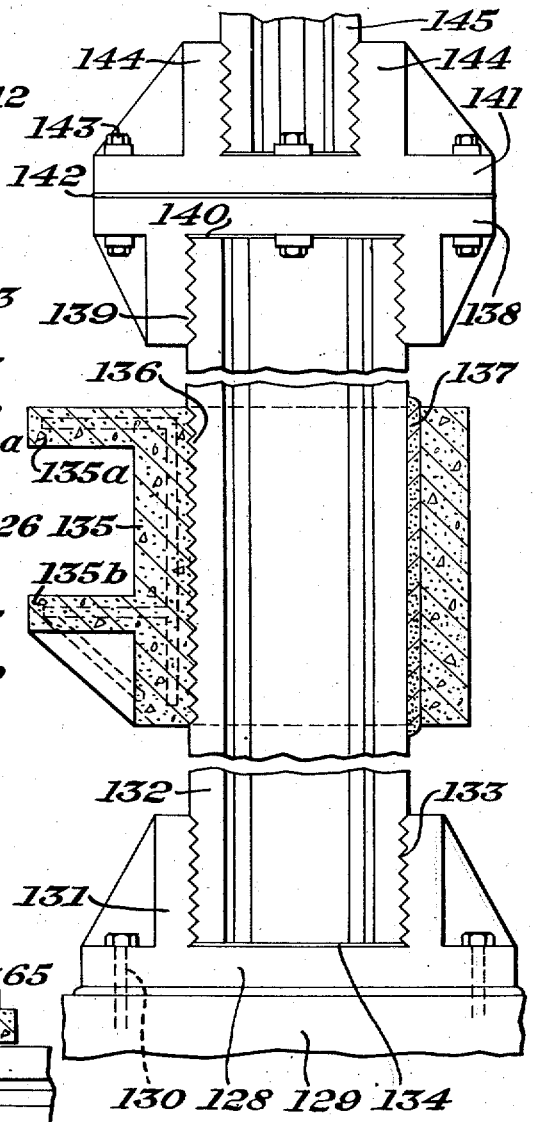
Figure 24 is an elevation of a column secured to a separately formed base by corrugated connections and provided with a bracket for supporting a beam and a connection to a superposed column of smaller sectional area.

Figure 24 illustrates several forms of connections adapted particularly for precast columns. A precast column base 128 is secured to a field-cast footer 129 by bolts 130 which may either be anchor bolts embedded in the footer or separate bolts threaded into double nuts, such as shown at 26 and 110, embedded therein. The base 128 has spaced upstanding walls 131 adapted to receive the lower end of a column 132 therebetween. The column is illustrated as of H-shape in section. The outer surfaces of the column flanges and the inner surfaces of the walls 131 of the base have meshing corrugations 133 formed therein. The column and base are assembled in the same manner as the beam 113 and bracket 107, i. e., by relative lateral movement, after the corrugations have been properly lined up. A thin film of grout is applied over the contacting surfaces. A layer of grout 134 is applied between the bottom of the column and the base to transmit to the base at least a portion of the load on the column, the remainder being transmitted through the corrugations 133.

A collar bracket 135 is disposed on the column at an appropriate height for supporting horizontal members such as girders or beams. The bracket is precast and reinforced. It is applied by placing it over the upper end of the column and moving it vertically therealong into proper position. The inside dimensions of the collar are sufficient to permit free movement thereof on the column. Meshing corrugations 136 are formed on one interior face of the collar and on one side of the column at the height at which the collar is to be fixed. When the collar has been placed at the proper height, it is moved laterally to cause meshing engagement of the corrugations. Thereafter, the clearance space between the bracket and column is filled with grout as at 137. The bracket 135 has upper and lower shelves 135a and 135b similar to those of bracket 122.

A cap 138 is disposed on top of the column 132. It is similar to the base 131 and has grout applied between its corrugations 139 meshing with those formed at the upper end of the column. A layer of grout 140 is applied to the top of the column before the cap is placed.

A base 141 is placed on the cap 138 with a layer of grout 142 therebetween and secured thereon by bolts 143 inserted through alined holes in the cap and base. The base 141 is similar to that shown at 131 except that its side walls 144 are adapted to accommodate a column 145 somewhat smaller than the column 132. The base 144 and the column 145 are united in the same manner as the base 128 and column 132 by meshing corrugations with grout applied as previously explained.

Figure 25:
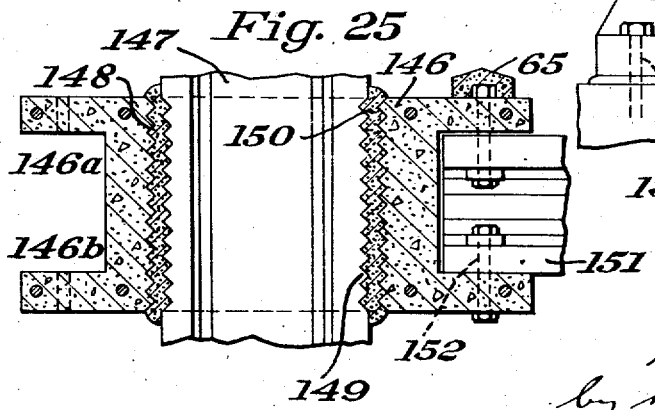
Figure 25 is a section through a one-piece collar having a corrugated connection to a column shown in elevation.

Figure 25 illustrates a precast reinforced concrete bracket 146 mounted on a column 147. The bracket has corrugations 148 on opposite interior walls. The column has corrugations 149 on the outer faces of its flanges. When the bracket has been positioned as illustrated, the space between it and the column is filled with grout as at 150. The inside dimensions of the collar are such as to permit free movement thereof along the column. The bracket has upper and lower shelves 146a and 146b on opposite sides thereof adapted to receive the ends of beams such as that shown at 151. Bolts 152 inserted through holes in the bracket shelves and beam flanges secure the beam to the bracket. The beam and column as illustrated are of H-shape in section. The bolts may have protective covers 65 on the heads thereof as illustrated in Figure 13.

It will be apparent that my invention provides a novel set of connections adapted for uniting various types of precast concrete structural members useful in the construction of buildings. The principal advantage of the several forms of connection is that they all have the ability to transmit shear load with a high degree of efficiency. This load is transmitted, furthermore, through the adjacent surfaces of the several members and not through the tie means where such are employed. The formation of corrugated surfaces on the various members is a simple matter, involving only the use of molds or cores having appropriately shaped surfaces. The precast nut and bolt covers afford protection for the tie means against corrosion and fire.

Although I have illustrated several forms of connection embodying my invention, it will be understood that changes in the details thereof as illustrated may be made without departing from the spirit of the invention or the scope of the appended claims.

I claim:

1. A structural connection comprising a precast concrete support member, a second precast concrete member supported thereon, said support member having corrugations formed in a lateral face thereof, and said second member having corrugations formed in the place thereof adjacent the corrugated face of the support member, the corrugations of the second member meshing with the corrugations of said support member, and means for reinforcing said corrugations in said members including metal plates embedded therein.

2. A structural connection as defined by claim 1 characterized by metal members embedded in said support member and welded to the plates embedded in the corrugations in said support member, and metal members embedded in said second member and welded to the plates embedded in the corrugations thereof.

3. A structural connection comprising a precast concrete support member and a precast concrete bracket member secured to said support member, said bracket member having a pocket therein, said pocket having substantially vertical-spaced side walls and an end wall, and corrugations formed in said spaced side walls and said end wall, the corrugations in the end wall being transverse to the corrugations in said spaced side walls.

4. A structural connection as defined by claim 3 characterized by corrugations formed in a face of said support member and corrugations formed in a face of said bracket member meshing with said first-mentioned corrugations.

5. A structural connection as defined by claim 3 characterized by a beam member having one end disposed in said pocket, the end portion of said beam member resting in said pocket having corrugations formed on the vertical sides thereof and a grout filling between the corrugations in said pocket and those of said beam member.

6. A structural connection comprising a precast concrete support member having a bracket secured thereto and a precast concrete beam member having one end supported on said bracket, substantially horizontal corrugations formed in the top of said bracket and corrugations meshing therewith formed in the bottom of said beam, substantially horizontal corrugations formed in the support member above the bracket, and corrugations meshing therewith formed in the end of said beam.

7. A structural connection comprising a precast concrete support member, a precast concrete bracket member thereon, said support member having substantially horizontal corrugations formed in a surface thereof, said bracket member having corrugations formed in one of its surfaces meshing with the corrugations of said support member, a beam member resting on said bracket, and a tie securing said beam on said bracket.

8. A structural connection comprising a precast concrete support member, a precast concrete collar bracket surrounding said support member, substantially horizontal corrugations formed in a surface of said support member and substantially horizontal corrugations formed in an interior face of said collar bracket, and a grout filling disposed between the corrugations in said support member and the corrugations in said collar member.

9. A structural connection comprising a precast concrete support member, a precast concrete saddle bracket member straddling said support member, said support member having substantially horizontal corrugations formed on opposite faces thereof and corrugations formed in the inner faces of said saddle bracket coacting with said corrugations in said support member.

10. In a building construction, a static concrete structure comprising a precast concrete support member, a precast concrete bracket member carried by the support member and another member bearing against the bracket member and normally exerting force thereagainst tending to shear the bracket member from the support member, the support member and the bracket member having opposed faces through which they bear against each other, said faces having interfitting corrugations extending transversely of the direction of said force.

ALBERT HENDERSON.

REFERENCES CITED

The following references are of record in the file of this patent:

UNITED STATES PATENTS

| Number | Name | Date |
|---|---|---|
| 967,007 | Fogg | Aug. 9, 1910 |
| 1,538,218 | Seelye | May 19, 1925 |
| 2,094,167 | Evers | Sept. 28, 1937 |